Feb. 3, 1970          J. F. CRAMWINCKEL          3,493,829
         MAGNETIC FLUX VALVE TYPE DATA TRANSMISSION DEVICE
              FOR REMOTE CONTROL OF ANGULAR POSITIONS
Filed Aug. 12, 1965                              2 Sheets-Sheet 2
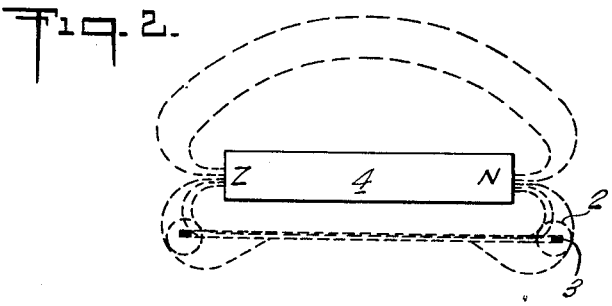
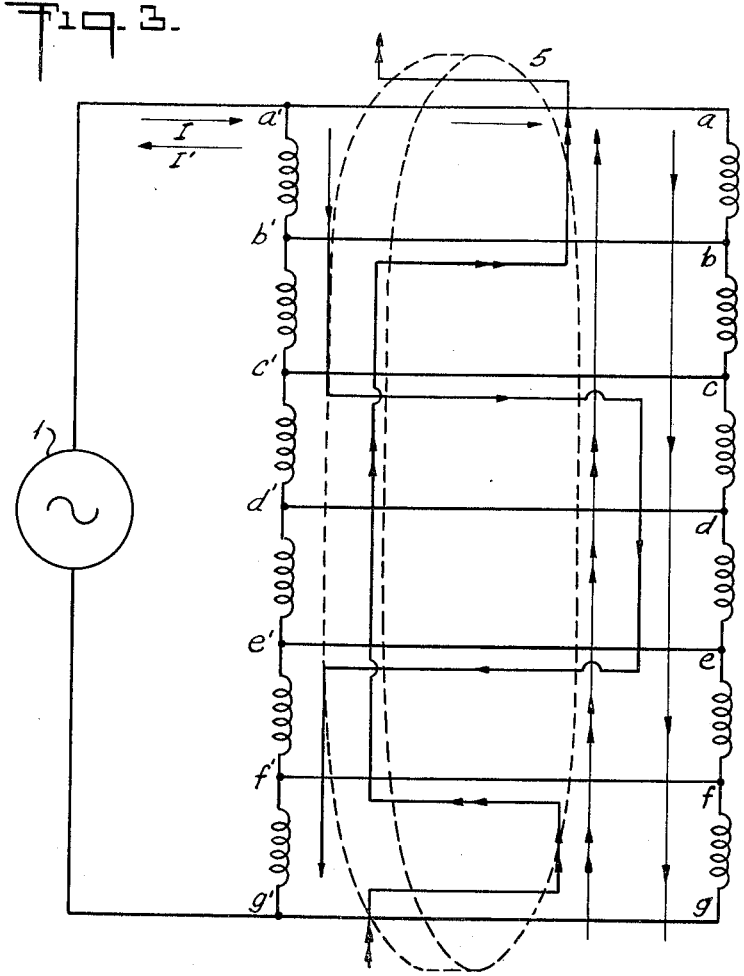
INVENTOR
JOHANNES FREDERICK CRAMWINCKEL
BY
Nolte & Nolte
ATTORNEYS United States Patent Office 3,493,829
Patented Feb. 3, 1970

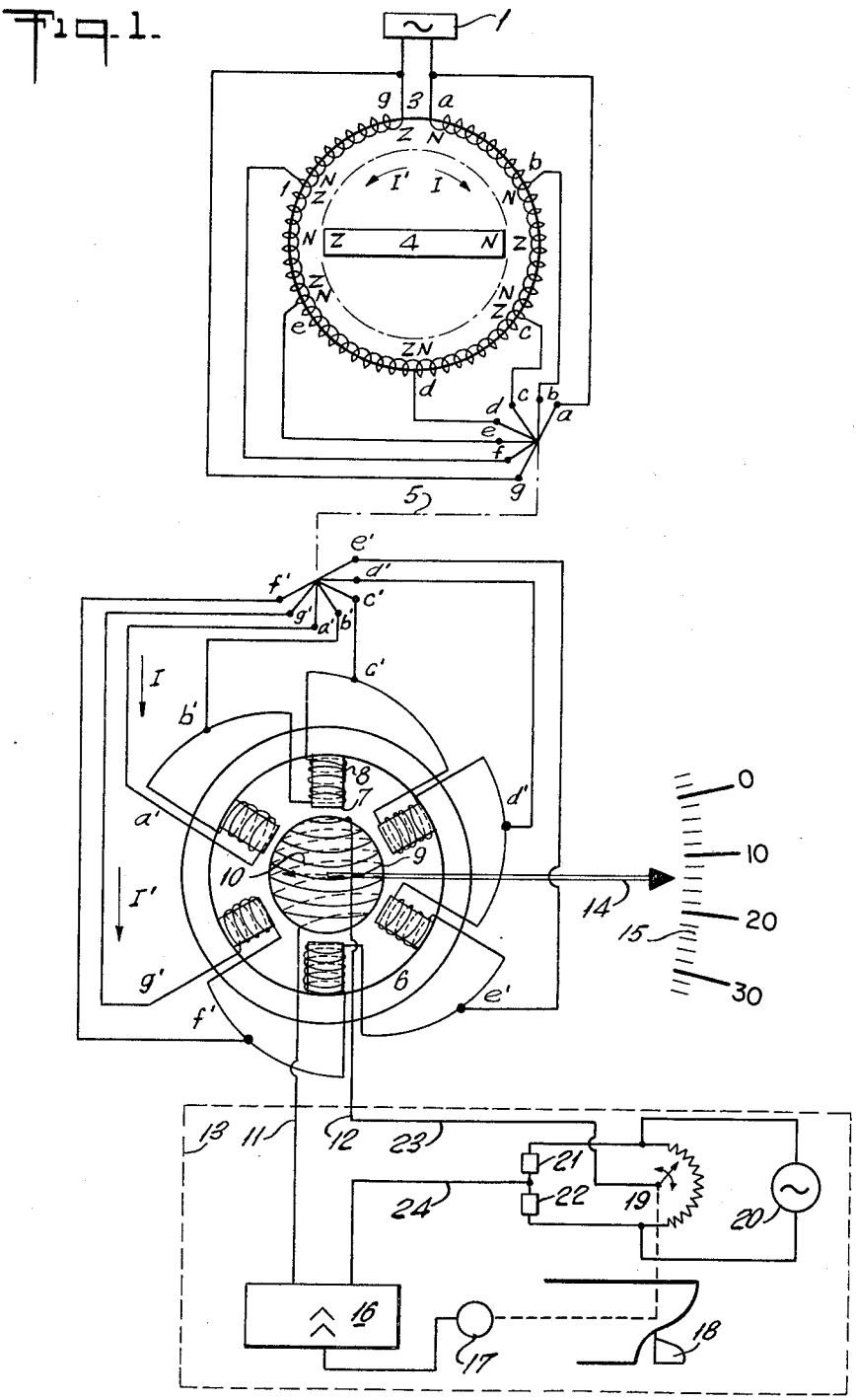

3,493,829
MAGNETIC FLUX VALVE TYPE DATA TRANSMISSION DEVICE FOR REMOTE CONTROL OF ANGULAR POSITIONS
Johannes Frederik Cramwinckel, Rotterdam, Netherlands, assignor to N.V. Nieuwe Rotterdamsche Instrumentenfabriek "Observator," Rotterdam, Netherlands, a limited-liability corporation of the Netherlands
Filed Aug. 12, 1965, Ser. No. 479,098
Claims priority, application Netherlands, Nov. 19, 1964, 6413448
Int. Cl. G05b *19/00*
U.S. Cl. 318—24                                                 4 Claims

ABSTRACT OF THE DISCLOSURE

The transmitter unit of the device comprises a ring of soft magnetic material forming a core of an even number of in series connected sections. A freely rotatable permanent magnet of a compass, the angular position of which is to be transmitted, is inductively coupled to said transmitter ring. A remote receiver unit comprises a ring shaped core of soft magnetic material having inwardly directed pole legs upon which respective receiver coils are wound. The receiver coils are connected in series one to another parallel with the corresponding coil sections at the transmitter. An adjustable coil having a disk-shaped core of soft magnetic material is disposed in the magnetic flux field of said pole legs. The transmitter coil sections and consequently the receiver coils are fed by an alternating current inducing a voltage in the disk-shaped adjustable coil, the magnitude of such voltage being proportional to angular position difference between the compass magnet and the preadjusted position of said disk-shaped coil.

---

The present invention relates in general to a remote data transmission system.

In particular the present invention relates to a magnetic flux type data transmission system for remote control of an angular position.

The devices of this type have been known from prior arts. For example the Dutch Patent No. 70,944 teaches a signal transmitter and signal receiver having three coils. Within the ring-shaped core of the receiver coil, a disk-shaped core of permanently magnetized ferromagnetic material is disposed for the rotatable movement and the angular position thereof is indicated by means of a pointer.

One of the disadvantages of such known devices resides in the fact that they are not suitable to present data in the form of electric output signals. Moreover, since the information is derived from the mechanical movement of a rotatable part, inaccuracies caused by frictional forces result.

Therefore the primary object of the present invention is to provide a remote data transmission system, which is independent of mechanical friction and which directly presents the information in the form of an electric output signal.

The signal device according to the invention is characterized in that the number of coils of the signal transmitter, respective of the signal receiver is an even number and the adjustable core within the ring-shaped core of the receiver carries a single output winding, suitable to be connected to an amplifier, and said adjustable core is not freely rotatable but is adjusted to a predetermined angular position with respect to the receiver ring.

The application of an even number of coils (which is greater than two) in the signal transmitter and signal receiver according to the invention has the result that the magnetic inductions in the signal receiver obtain the same direction during both half periods of the feeding alternating current, so that a neutral position is possible for the adjustable coil of the signal receiver, i.e. a position, in which the magnetic field acting thereon, is directed with respect to the coil windings, such that no voltage is induced.

It is advantageous to apply the coils of the signal receiver ring to spoke-shaped, inwardly directed projections of the ring. As a result hereof the magnetic fields are directed to the centre of the rotatable core, which makes the device more sensitive and gives a stronger output signal.

The output signal of the device according to the invention is suitable to operate via an amplifier, e.g. the servomotor of a control machine of a vessel or an aeroplane for the automatic correction of occurring deviations with respect to a certain course, which was predetermined by adjusting the adjustable core of the signal receiver in a certain position.

It is also possible to use the signal device according to the invention for the operation of a warning installation via an amplifier, said warning installation e.g. comprising one or more klaxons for giving a warning signal, if the course followed by the ship or aeroplane, shows a deviation with respect to the adjusted course, which exceeds a certain value (e.g. 10°).

The device according to the invention has the great advantage that it can quickly and easily be connected to an existing magnetic compass, by which the possibilities of use of the latter can be enlarged very considerably.

In order to prevent that the signal transmitter according to the invention could exert an undesired influence on the position of the permanent magnet, such as a compass needle, with which it cooperates, it is recommendable to position the signal transmitter in such a way that the distance between the horizontal plane of symmetry of the permanent magnet and the horizontal plane of symmetry of the signal transmitter is at least equal to twice the length of the permanent magnet.

It can be remarked that the device according to the invention can also be used without a permanent magnet in some cases, because the signal transmitter responds to changes of its position with respect to the earth magnetic field, and the device gives herewith an output signal of a usable intensity.

The above-mentioned possibilities of application are only meant by way of example. It is of course possible to use the device according to the invention everywhere, when it is desired to transmit in a remote way a deviation of the position for the supply of a strong signal.

The invention will further be elucidated by means of an example as shown in the drawing, in which:

FIGURE 1 is a scheme of a device according to the invention, applied to the control machine of a ship, FIGURE 2 is a side view of the signal transmitter of the device, in which also the course of the occurring magnetic lines of force is drawn schematically, and FIGURE 3 is a scheme of the circuit of the coils of the signal transmitter and the signal receiver.

An alternating voltage source 1 in FIGURE 1 delivers via the connections *a* and *g* a current of alternating direction through an assembly of coils, indicated by the general reference numeral 2, wound around a ring 3 of magnetisable material. The ring 3, preferably of Mu Metal, or another suitable ferromagnetic material, is arranged concentrically underneath or above the magnet 4 of a magnetic compass, not further indicated, in a construction, which is supposed to be known. The coil assembly 2 is formed by six mutually equal coils and is branched at five places, marked b–f inclusive. The ring 3 with its coil assembly 2 forms the signal transmitter. A multicore cable 5 connects said transmitter to a remote signal receiver, which consists of a ring 6 of ferromagnetic, non-permanent magnetic material, having six inwardly directed legs 7, each carrying a coil 8.

The six coils 8 are connected in series and are connected to the alternating voltage source 1 via the points $a^1$ and $g^1$, so that the alternating current flowing through the coils 8, induces a magnetic field in each of the legs 7, which field is directed inwardly during the one half period of the alternating current and is directed outwardly during the second half period. Since the magnetic effects, caused by said feeding source in the six legs 7 of the receiver, compensate each other no observable alternating field in the centre of the ring 6 occurs.

A disc 9 of ferromagnetic non-permanent magnetic material is rotatably arranged, concentrically with the ring 6, and is provided with a winding 10, the terms of which lie in mutually parallel planes. The winding 10 is connected via conductors 11 and 12 to an automatic controlling device 13 of the ship on which the installation is arranged.

The disc 9 is adjustable over 360° and by means of a setting means having a pointer 14 and graduation 15 the position of the disc can be adjusted to a fixed position with respect to the ring core 6, fixedly arranged on the ship.

The alternating voltage, induced by the signal transmitter in the coil 10, is conducted to the amplifier 16, which amplifies the signal and causes an excitation of the control machine 17, not further described, and finally leads to deflection of the rudder 18.

A slider arm 19 of a variable resistance is mechanically connected to the helm to convert the deflection of the rudder to a proportional voltage change between the conductors 12 and 24 with the aid of a known Wheatstone bridge circuit, consisting of an alternating voltage feeding source 20 and non-variable resistance elements 21 and 22. The voltage produced by the adjustment of the rudder between the connections 23 and 24 is proportional with the deflection of the rudder and the bridge of the Wheatstone is preferably adjusted such, that the voltage is zero, when the rudder is amidships, owing to which deflections of the rudder to a different direction, also alternating voltages are produced, having a phase difference of 180°.

The alternating voltage, proportional with the deflection of the rudder between the conductors 12 and 24 at the input of an amplifier 16 is substracted from the alternating voltage, induced by the signal transmitter in the coil 10 since the phase ratio and frequency of the aforementioned signals are mutually equal, the two voltages will compensate each other at a certain deflection of the rudder, so that the amplifier 16 does no longer receive an input signal and the control machine 17 and the rudder 18 will become inactive.

In the cable 5, as shown in FIGURES 1 and 3, separate conductors connect the branches b–f inclusive of the transmitter to the branches $b^1$–$f^1$ of the receiver, by which the coils ab, bc, cd etc. of the transmitter are parallel connected to the respective coils $a^1b^1$, $b^1c^1$, $c^1d^1$, etc. of the receiver.

WAY OF OPERATION

Under influence of the lines of force of the magnet 4, as shown in a side sectional view in FIG. 2, the soft iron ring 3 is magnetized, so that in the different ring portions poles are formed, as indicated in FIGURE 1.

During the current passage in the direction I (FIGURES 1 and 3) the magnetization caused by the current in the ring portions fg and ab is subtracted from that, caused by the compass magnetic needle, whereas in the portions cd and de both magnetising influences are added, so that with an exact dimensioning a saturation is produced in the latter soft iron ring portions.

The frequency of the voltage from the voltage source 1 has been chosen such, that the self-induction for each coil is substantially determining for its impedance, so that at the saturation of the iron of a coil, its impedance will be reduced considerably.

In FIGURE 3 the effect of said impedance reduction is illustrated. The current I from the feeding source is divided into two portions, the first current portion passing through the receivers coil $a^1$ and $g^1$ and the second one through the transmitter coil ag. If there would be no saturation by premagnetisation as a result of the compass magnet, then the same fractions of voltage would occur in the coils $a^1b^1$, $b^1c^1$, etc. of the receiver and ab, bc, cd, etc. of the transmitter, provided they are dimensioned mutually equally owing to which the connecting conductors $bb^1$, $cc^1$, etc., would be without current.

The coils cd and de of the transmitter, however, are saturated during the half period in which the direction of the current I occurs. As a consequence, the impedance of said coils cd and de is reduced and they thus take up a part of the current through the receiver, which would otherwise run through the coils $c^1d^1$ and $d^1e^1$.

During the current passage in the opposite direction $I^1$ the parts fg and ab of the transmitter are saturated by the magnetising forces acting in said parts, so that the current through the coils gf and ba is increased whereas the current in the coil parts $g^1f^1$ and $b^1a^1$ is consequently reduced.

In the receiver this will have the result that the amount of current in the coils $c^1d^1$ and $d^1e^1$ prevails in the direction $I^1$, which involves that in the legs whereon said coils are wound, during the half period that the current runs in the direction $I^1$, simultaneously magnetic induction pulses, directed to the middle of the receiving coil 10, occur which at that moment are not completely compensated by magnetic induction pulses, also directed to the middle of the coil 10, in the opposite coils $g^1f^1$ and $b^1a^1$.

During said half period the magnetic inductions of all legs 7 consequently do not compensate each other and a resulting field is produced in the coil 10, which has a direction as shown with the arrow drawn in full line in FIGURE 1.

In the subsequent half period of the alternating voltage, when the current direction I occurs, the coils $a^1b^1$ and $f^1g^1$ in the receiver have a current and produce a magnetic induction in the appertaining legs of the iron core 6, which induction is directed outwardly and is not completely compensated by magnetic inductions, also directed outwardly, in the legs of the coils $c^1d^1$ and $d^1e^1$. Said outwardly directed induction, which occurs simultaneously in both legs (dash line arrows) can be composed again to one magnetic direction in the coil 10, as shown in FIGURE 1 by the dash line arrow.

The induction during both half periods of the current passage in the system consequently produce semi-sinusoidal induction pulses, having an equal direction.

Thus it is possible to adjust the coil 10, e.g. by rotating it by hand, in such a way, that the direction of the magnetic induction in the carrier or disc core 9 of the coil 10 coincides with the plane of the windings of the coil 10, by which no E.M.F. will be produced (neutral position). If the coil is turned away from said position by hand, then the semi-sinusoidal magnetic pulses at the terminals 11 and 12 of the coil 10 will cause an E.M.F. which is proportional in amplitude to the sinus of the angle of rotation with respect to the neutral position, and has a frequency, which amounts to twice the frequency of the feeding source 1 and is shifted in phase 180° in the positions at both sides of the neutral position.

As for small angles the sinus is almost proportional to the magnitude of the angle, a voltage is consequently produced at the terminals 11 and 12, which is substantially proportional to the angle difference between the position of the compass magnet 4 with respect to the fixedly arranged ring 3 (the course of the ship) and between the position of the coil carrier 10 having the pointer 14 with respect to the fixedly arranged ring 6 and graduation 15 (the course which is desired to be maintained).

Of course the generator 20 must have a frequency equal to twice the frequency of the generator 1 in order to subtract the counter voltage, produced by the deflection of the rudder, from the voltage at 11 and 12.

In the position, drawn in FIGURE 1, the coils $bc$ and $fe$ in the receiver are magnetised in both magnetising directions over equal lengths, so that the saturation effects in both current directions I and $I^1$ are also equal. Owing to this they have no influence on the formation of the error signal.

This changes, however, when the magnet 4 will come into another position and will no longer be symmetrical with respect to said coils. Owing to this said coils will also contribute to the formation of the magnetic field in the receiver 6, by which said field is changed in direction and the coil 10 must be displaced into another position in order to find the neutral position.

What is claimed is:

1. A magnetic flux gate type angular data transmission device, comprising a non-rotatable signal transmitter cooperating with a freely rotatable permanent magnet, the angular position of which, relative to said signal transmitter, is to be transmitted, and a remote signal receiver electrically coupled to said signal transmitter; the signal transmitter being comprised of a first ring of ferromagnetic, non-permanent material, an even number of at least four mutually equal coils, said coils being connected in series and wound on said first ring, an alternating voltage source connected to energize said coils; the signal receiver being comprised of a second ring of ferromagnetic, non-permanent magnetic material, the same number of mutually equal coils as are at the transmitter, said last mentioned coils being interconnected in series and magnetically coupled to said second ring, the connecting point of every two adjacent coils of the signal transmitter being electrically connected to the corresponding connecting point of two adjacent coils of the signal receiver, a movable core of ferromagnetic material being arranged in the second ring, said core carrying a winding adapted to induce from respective receiver coils a voltage proportional to the angular position of said movable core, and setting means operatively coupled to said movable core to adjust the same to a predetermined angular position with respect to said second ring.

2. The device according to claim 1, wherein the coils of the signal receiver are wound on spoke-shaped, inwardly directed projections of the ring and said movable core is concentrically arranged with said ring between the latter projections.

3. The device according to claim 1, wherein the distance between the horizontal plane of symmetry of the signal transmitter ring and the horizontal plane of symmetry of the permanent magnet with which the signal transmitter cooperates, is equal at least to twice the length of the permanent magnet.

4. The device according to claim 1, further comprising a movable carrier for the entire device whereby said permanent magnet is a rotatably supported compass magnet.

References Cited

UNITED STATES PATENTS

| | | | |
|---|---|---|---|
| 2,621,314 | 12/1952 | Wendt | 318—24 XR |
| 2,704,353 | 3/1955 | Alkan | 336—135 XR |
| 2,810,102 | 10/1957 | Depp et al. | 318—24 XR |
| 3,113,301 | 12/1963 | Templin | 318—24 XR |

FOREIGN PATENTS 67,190  7/1948  Denmark.

BENJAMIN DOBECK, Primary Examiner

U.S. Cl. X.R.

318—28